(12) United States Patent
Flores et al.

(10) Patent No.: US 11,449,579 B2
(45) Date of Patent: Sep. 20, 2022

(54) FILE-BASED SOFTWARE APPLICATION DISCOVERY

(71) Applicant: ServiceNow, Inc., Santa Clara, CA (US)

(72) Inventors: Julian Michael Flores, Dallas, TX (US); Rohan Tyagi, San Jose, CA (US); Sreenevas Subramaniam, Dublin, CA (US); Sanjeet Singh Sahai, Mountain View, CA (US); Amit Dhuleshia, San Diego, CA (US); Gregory James Grisco, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 837 days.

(21) Appl. No.: 16/212,396

(22) Filed: Dec. 6, 2018

(65) Prior Publication Data

US 2020/0089843 A1    Mar. 19, 2020

Related U.S. Application Data

(60) Provisional application No. 62/733,428, filed on Sep. 19, 2018.

(51) Int. Cl.
*G06F 7/00* (2006.01)
*G06F 21/10* (2013.01)
(Continued)

(52) U.S. Cl.
CPC ............ *G06F 21/105* (2013.01); *G06F 16/13* (2019.01); *G06F 16/148* (2019.01);
(Continued)

(58) Field of Classification Search
CPC .... G06F 16/182; G06F 16/1873; G06F 16/86; G06F 16/148; G06F 16/13; G06F 21/105; H04L 4/046
See application file for complete search history.

(56) References Cited

U.S. PATENT DOCUMENTS

| 1,000,203 A | 8/1911 | Shannon |
| 5,978,594 A | 11/1999 | Bonnell |

(Continued)

FOREIGN PATENT DOCUMENTS

| EP | 3399695 | * | 7/2018 |
| EP | 3641221 A1 | * | 4/2020 |

OTHER PUBLICATIONS

Meet professor who developed Wifi-Like Device that sees through walls to receive acm prize in computing. ACM 2017.*

(Continued)

*Primary Examiner* — Daniel A Kuddus
(74) *Attorney, Agent, or Firm* — Fletcher Yoder PC

(57) ABSTRACT

A system may include a computational instance disposed within a remote network management platform and associated with a managed network, where the computational instance contains a configuration management database. The system may also include a software application disposed on a server device of the managed network and configured to perform operations comprising: obtaining, from the configuration management database, a list of directories, a list of file types, and a list of file names; remotely accessing a computing device of the managed network; for each respective directory in the list of directories, obtaining, from the computing device, information respectively related to discovered files that are: (i) disposed within the respective directory on the computing device, and (ii) specified by the list of file types or specified in the list of file names; and (Continued)

transmitting, to the configuration management database, the information related to the discovered files.

20 Claims, 11 Drawing Sheets

(51) Int. Cl.
H04L 41/046 (2022.01)
G06F 16/14 (2019.01)
G06F 16/182 (2019.01)
G06F 16/84 (2019.01)
G06F 16/18 (2019.01)
G06F 16/13 (2019.01)

(52) U.S. Cl.
CPC ........ *G06F 16/182* (2019.01); *G06F 16/1873* (2019.01); *G06F 16/86* (2019.01); *H04L 41/046* (2013.01)

(56) References Cited

U.S. PATENT DOCUMENTS

| | | | |
|---|---|---|---|
| 6,321,229 B1 | 11/2001 | Goldman | |
| 6,799,189 B2 | 9/2004 | Huxoll | |
| 6,816,898 B1 | 11/2004 | Scarpelli | |
| 6,895,586 B1* | 5/2005 | Brasher | H04L 61/1558 709/201 |
| 7,020,706 B2 | 3/2006 | Cates | |
| 7,027,411 B1 | 4/2006 | Pulsipher | |
| 7,392,300 B2 | 6/2008 | Anantharangachar | |
| 7,617,073 B2 | 11/2009 | Trinon | |
| 7,685,167 B2 | 3/2010 | Mueller | |
| 7,716,353 B2 | 5/2010 | Golovinsky | |
| 7,769,718 B2 | 8/2010 | Murley | |
| 7,877,783 B1 | 1/2011 | Cline | |
| 7,925,981 B2 | 4/2011 | Pourheidari | |
| 7,933,927 B2 | 4/2011 | Dee | |
| 7,941,506 B2 | 5/2011 | Bonal | |
| 7,945,860 B2 | 5/2011 | Vambenepe | |
| 8,082,222 B2 | 12/2011 | Rangarajan | |
| 8,151,261 B2 | 4/2012 | Sirota | |
| 8,346,752 B2 | 1/2013 | Sirota | |
| 8,380,645 B2 | 2/2013 | Kowalski | |
| 8,402,127 B2 | 3/2013 | Solin | |
| 8,554,750 B2 | 10/2013 | Rangaranjan | |
| 8,612,408 B2 | 12/2013 | Trinon | |
| 8,646,093 B2 | 2/2014 | Myers | |
| 8,683,032 B2 | 3/2014 | Spinelli | |
| 8,745,040 B2 | 6/2014 | Kowalski | |
| 8,812,539 B2 | 8/2014 | Milousheff | |
| 8,832,652 B2 | 9/2014 | Mueller | |
| 8,907,988 B2 | 12/2014 | Poston | |
| 9,015,188 B2 | 4/2015 | Behne | |
| 9,037,536 B2 | 5/2015 | Vos | |
| 9,098,322 B2 | 8/2015 | Apte | |
| 9,137,115 B2 | 9/2015 | Mayfield | |
| 9,261,372 B2 | 2/2016 | Cline | |
| 9,317,327 B2 | 4/2016 | Apte | |
| 9,323,801 B2 | 4/2016 | Morozov | |
| 9,363,252 B2 | 6/2016 | Mueller | |
| 9,430,491 B2* | 8/2016 | Vibhor | G06F 16/275 |
| 9,412,084 B2 | 9/2016 | Kowalski | |
| 9,467,344 B2 | 10/2016 | Gere | |
| 9,534,903 B2 | 1/2017 | Cline | |
| 9,613,070 B2 | 4/2017 | Kumar | |
| 9,631,934 B2 | 4/2017 | Cline | |
| 9,645,833 B2 | 5/2017 | Mueller | |
| 9,654,473 B2 | 5/2017 | Miller | |
| 9,659,051 B2 | 5/2017 | Hutchins | |
| 9,753,816 B2* | 9/2017 | Mehta | G06F 11/1451 |
| 9,766,935 B2 | 9/2017 | Kelkar | |
| 9,792,387 B2 | 10/2017 | George | |
| 9,798,596 B2* | 10/2017 | Vibhor | G06F 9/4881 |
| 9,805,322 B2 | 10/2017 | Kelkar | |
| 9,852,165 B2 | 12/2017 | Morozov | |
| 9,967,162 B2 | 5/2018 | Spinelli | |
| 10,044,566 B1* | 8/2018 | Grisco | G06F 16/27 |
| 10,972,435 B2* | 4/2021 | Biran | G06F 21/52 |
| 2002/0173984 A1* | 11/2002 | Robertson | H04L 61/1558 709/220 |
| 2008/0243900 A1* | 10/2008 | Yohanan | H04L 41/12 707/999.102 |
| 2009/0193046 A1* | 7/2009 | Desai | G06F 16/221 |
| 2013/0117219 A1* | 5/2013 | Malka | G06F 16/215 707/603 |
| 2013/0226868 A1* | 8/2013 | Messinger | G06F 16/2365 707/610 |
| 2014/0201141 A1* | 7/2014 | Vibhor | H04L 67/18 707/622 |
| 2015/0127788 A1* | 5/2015 | Vittal | H04L 12/2852 709/221 |
| 2016/0162370 A1* | 6/2016 | Mehta | G06F 11/1451 707/610 |
| 2017/0235756 A1* | 8/2017 | Mehta | G06F 16/1873 707/620 |
| 2017/0308601 A1* | 10/2017 | Massarenti | H04L 41/0856 |

OTHER PUBLICATIONS

Le Jamtel Emilien: "Swimming in Monero Pools"; IEEE, 2018.*
ServiceNow Documentation, printed from https://docs.servicenow.com/bundle/jakarta-it-operations-management/page/product/discovery/reference/r-discovery.html, Nov. 15, 2018.

* cited by examiner

FILE-BASED SOFTWARE APPLICATION DISCOVERY

CROSS-REFERENCE TO RELATED APPLICATION

This application claims priority to U.S. provisional patent application Ser. No. 62/733,428, filed Sep. 19, 2018, which is hereby incorporated by reference in its entirety.

BACKGROUND

An enterprise may use many computing devices to efficiently facilitate and manage its many interrelated operations. Each such computing device may have one or more software applications installed thereon. Where the software is proprietary, the enterprise may procure licenses for the computing devices to use the software. Given this, the enterprise may desire to maintain accurate identifying information about its software, so that the enterprise can properly track usage of software and to what degree such usage complies with licenses associated with the software.

SUMMARY

In practice, a system may include a remote network management platform that manages a managed network of an enterprise. The system may collect information about software installed on computing devices in the managed network, and may store this information in a configuration management database. Each unit of software may be identified by one or more of a directory in which it is disposed, a file type, and/or a file name. The system may use the collected information to determine or infer the publisher name, product name, edition, and/or version of the software.

Accordingly, a first example embodiment may involve a computational instance disposed within a remote network management platform and associated with a managed network, where the computational instance contains a configuration management database. The system may also include a software application disposed on a server device of the managed network and configured to perform operations comprising: obtaining, from the configuration management database, a list of directories, a list of file types, and a list of file names; remotely accessing a computing device of the managed network; for each respective directory in the list of directories, obtaining, from the computing device, information respectively related to discovered files that are: (i) disposed within the respective directory on the computing device, and (ii) specified by the list of file types or specified in the list of file names; and transmitting, to the configuration management database, the information related to the discovered files.

A second example embodiment may involve obtaining, by a software application executing on a server device and from a configuration management database, a list of directories, a list of file types, and a list of file names. The second example embodiment may also involve remotely accessing, by the software application, a computing device of a managed network. A computational instance of a remote network management platform may contain the configuration management database and may be associated with the managed network. In some cases, the server device is disposed within the managed network. The second example embodiment may also involve, for each respective directory in the list of directories, obtaining, by the software application and from the computing device, information respectively related to discovered files that are: (i) disposed within the respective directory on the computing device, and (ii) specified by the list of file types or specified in the list of file names. The second example embodiment may also involve transmitting, by the software application and to the configuration management database, the information related to the discovered files.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
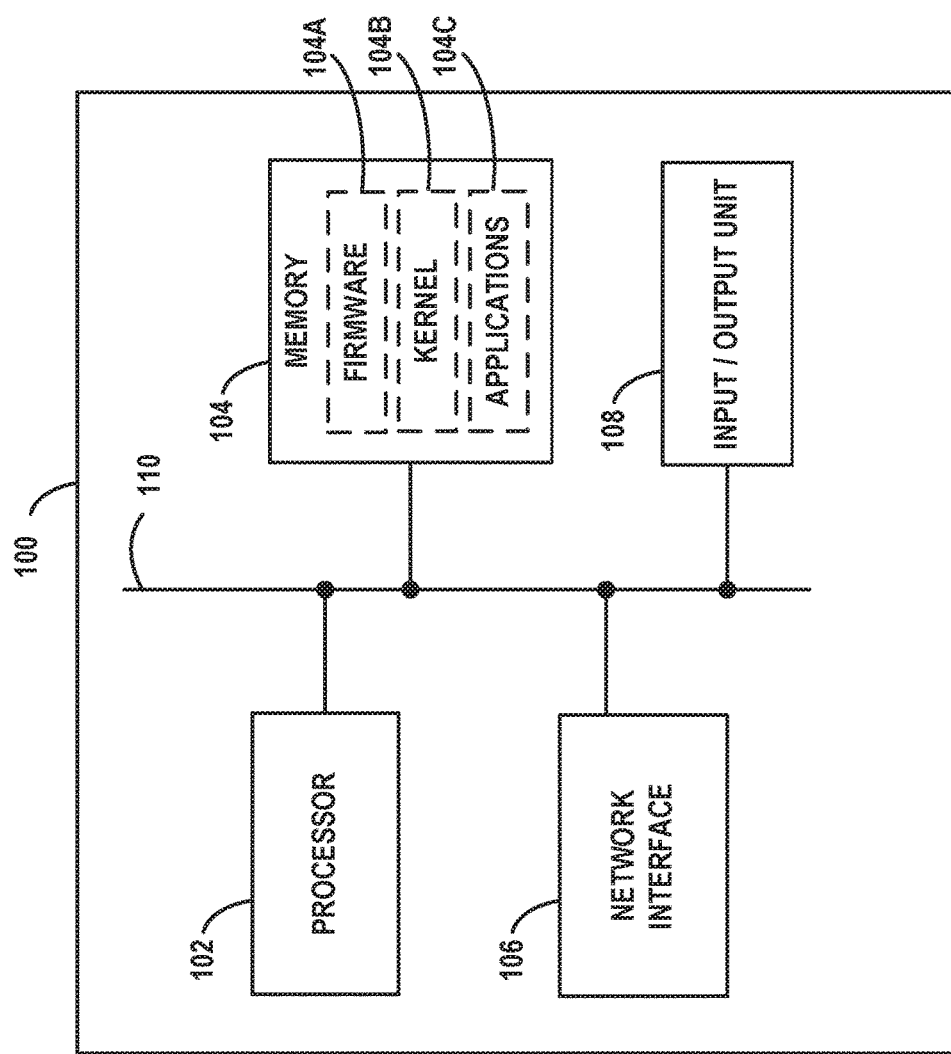
FIG. 1 illustrates a schematic drawing of a computing device, in accordance with example embodiments.

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
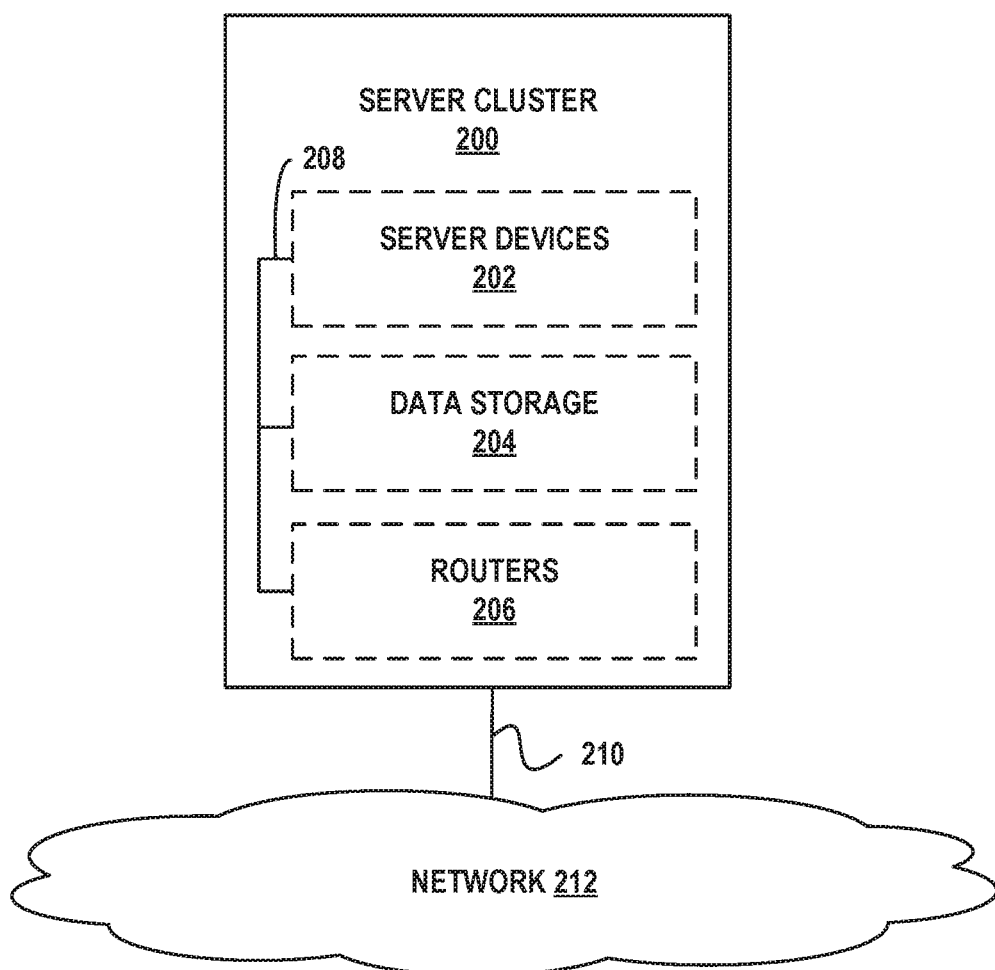
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
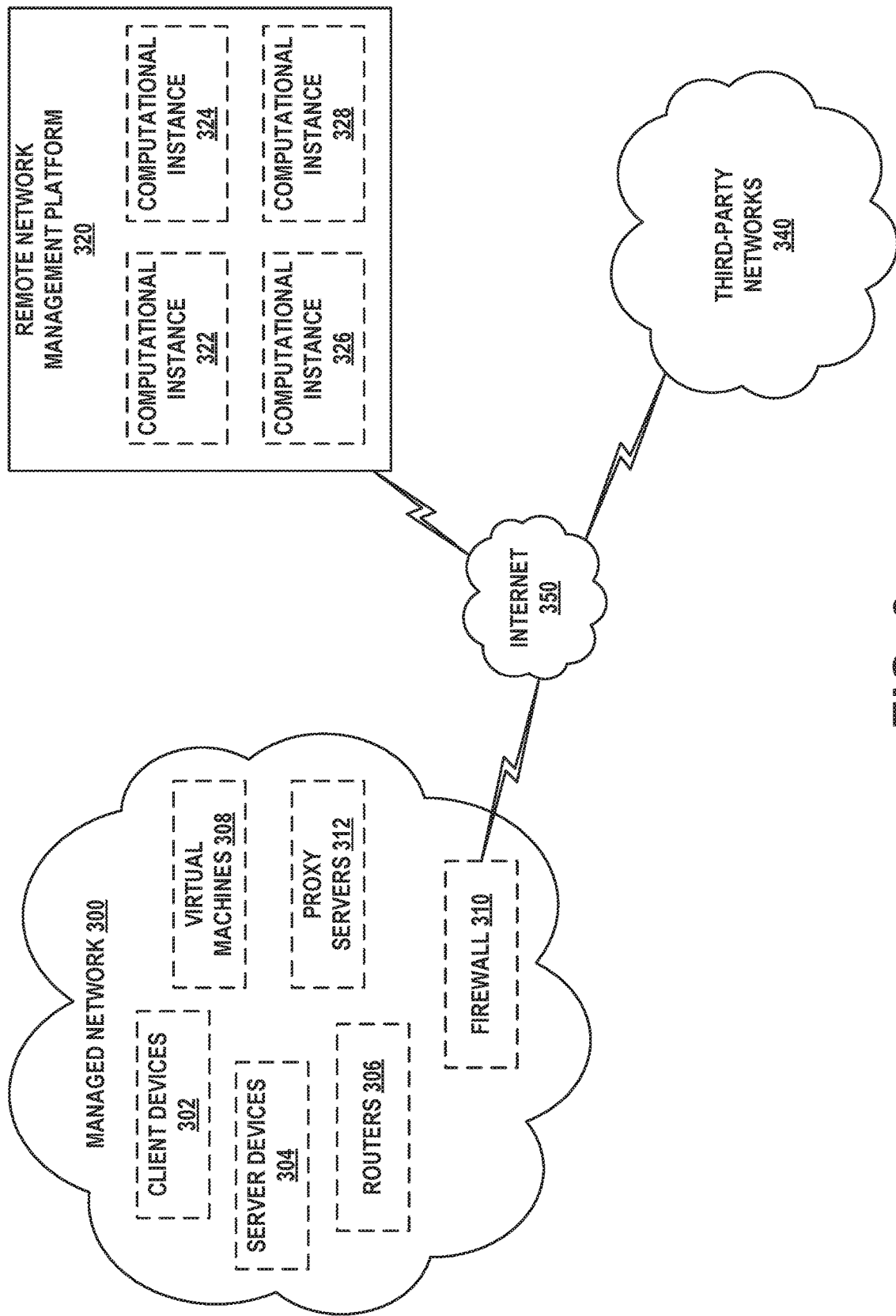
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
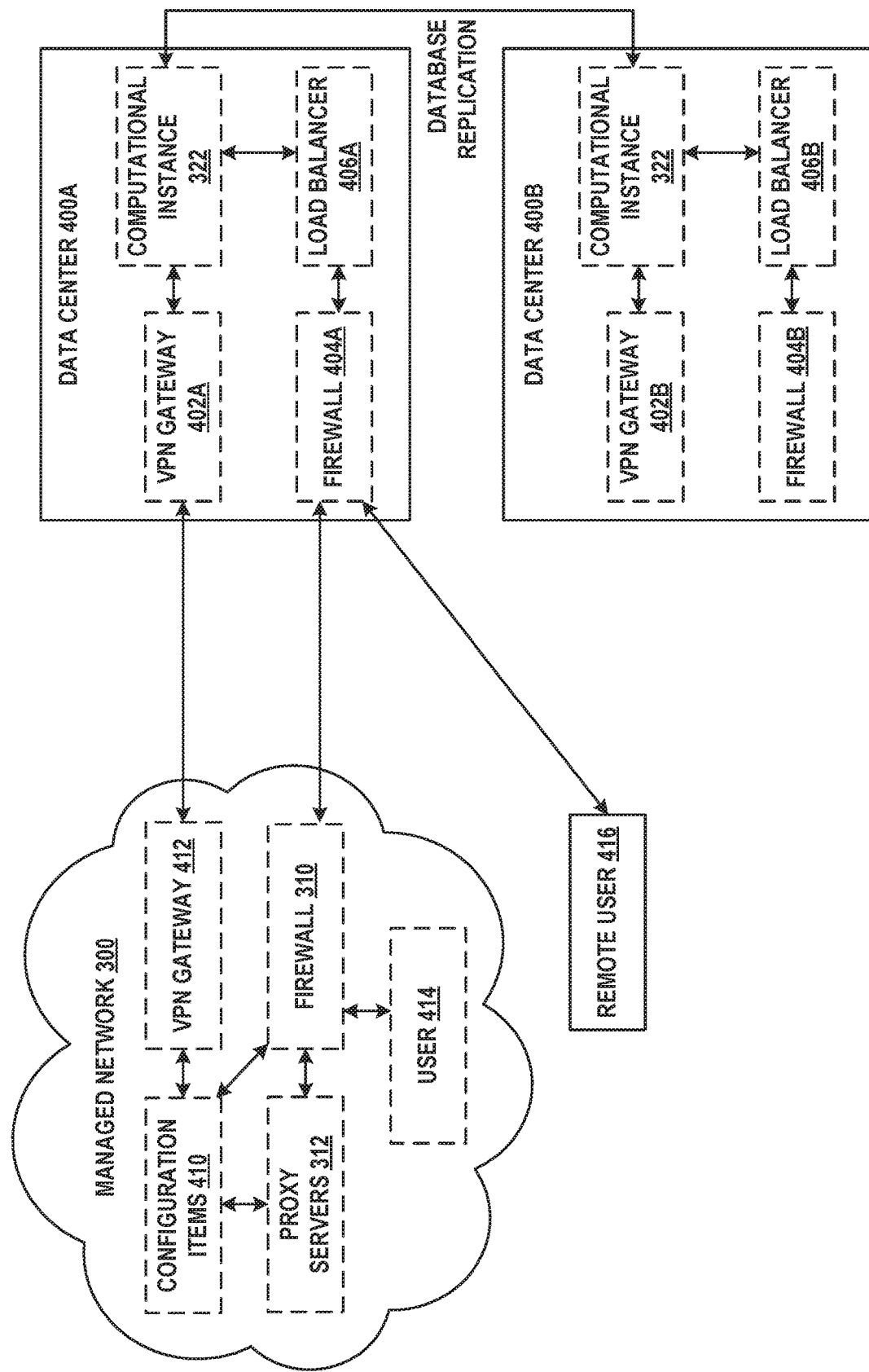
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
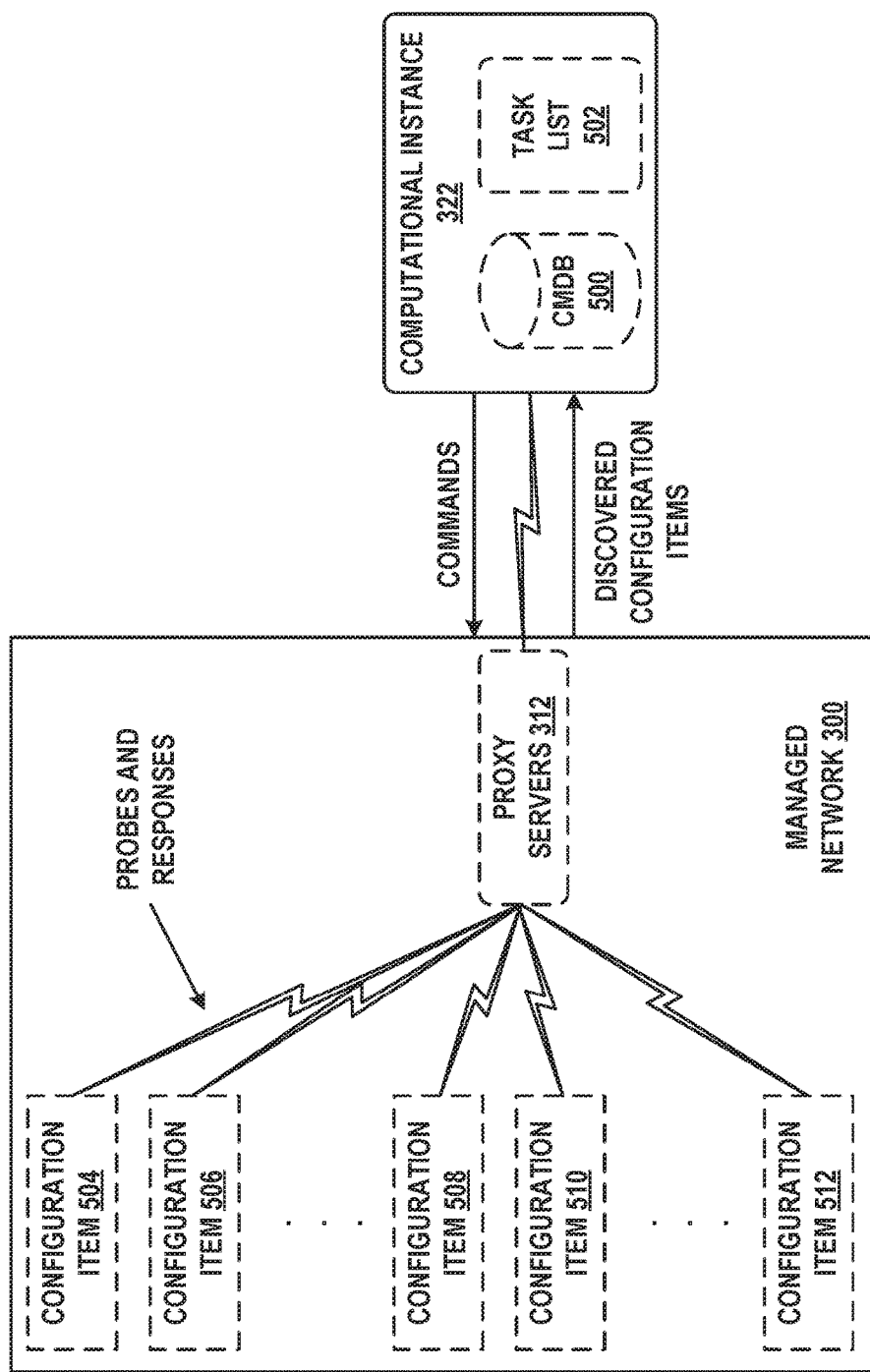
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
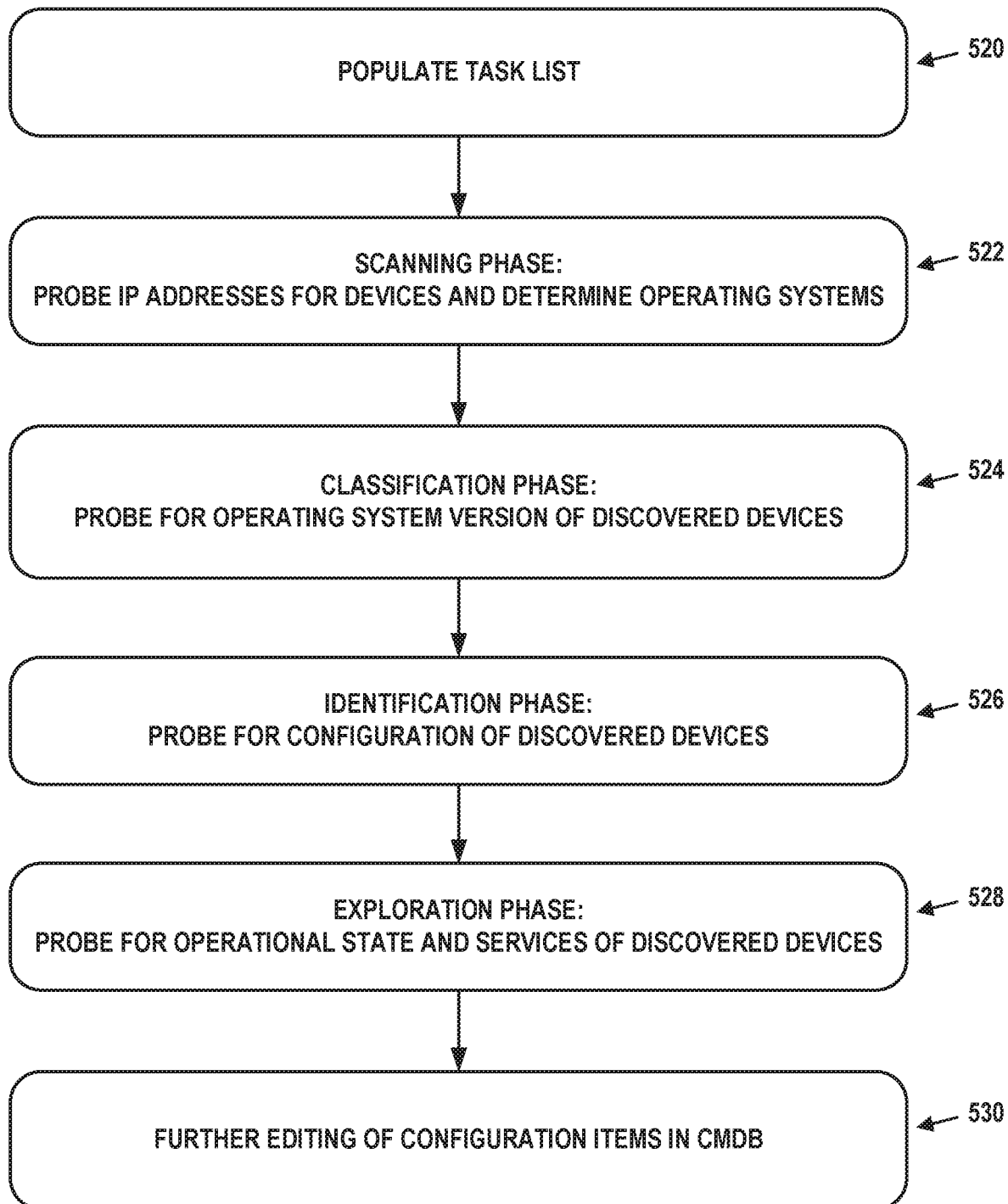
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. File-Based Software Application Discovery

As noted previously, discovery of software applications on computing devices in a managed network may involve accessing the computing devices by some form of remote access protocol (e.g., SSH), and invoking shell commands to determine executing processes. Information regarding these executing processes is stored in CDMB 500. A software asset management application may then use this information to determine what applications are installed on these computing devices based on the file names, command line parameters, and/or directories associated with the executing processes.

The software asset management application may then compare the discovered installations to licenses for this application that have been obtained by the managed network. In this fashion, actual license use can be reconciled with purchased licenses. If the usage is higher than the number of purchased licenses, more licenses can be purchased, or unneeded installations can be removed. If the usage is lower than the number of purchased licenses, then some of the licenses might not be renewed.

A downside to the process-based approach, however, is that computing devices may have installed thereon applications that rarely or never execute. Or, such an application might not be executing when discovery is performed on a computing device. As a result, process-based discovery can fail to discover these applications.

Instead of in addition to determining executing processes, software installed on a computing device may be found by querying a registry. For instance, the computing device may be accessed by way of a remote access protocol and the registry may be queried using shell commands. As example, on WINDOWS® devices, most software packages add entries for themselves in the WINDOWS® registry. Similarly, on LINUX® devices, most software packages are listed in a package manager registry (e.g., accessible by way of the dpkg command). Still, not all software installed on a computing device may be properly represented in a registry. Thus, registry-based discovery will also undercount such installations. Furthermore, various types of viruses, worms, Trojan horses, or other malware may intentionally avoid creating registry entries for themselves, thereby making them harder to detect.

The consequence of this failure is that the software asset management application is then unable to count these applications toward license usage within the managed network. As such, when the software asset management application compares the number of discovered installations of a particular software application with the number of purchased licenses, the undercounting of actual installations may result in the managed network determining erroneously that it is in compliance with its purchased licenses. This subjects the managed network to various liabilities and penalties.

As an example, suppose that a managed network obtains 50 licenses for a word processing application. The managed network may contain several hundred devices, 55 of which have the word processing application installed. Unless the word processing application is executing on each of these devices during discovery or properly represented in a registry entry, it will be undercounted. For instance, discovery may find that only 40 of devices have the word processing application installed. As a result, the managed network may determine that it is under-utilizing its licenses when it is actually over-utilizing these licenses.

But beyond license compliance, being able to determine the number of installed software applications across a managed network has a number of advantages. For applications that are no longer supported or needed, the managed network can identify the computing devices on which these applications are installed, and can flag the applications for removal. In this way, storage space is saved. Additionally, if the managed network determines that an application is popular (in that it is installed on at least a threshold number or percent of computing devices within the managed network or a part thereof), the managed network may decide to make this application "standard" in that it is automatically installed on at least some computing devices. Moreover, users may have installed unapproved applications that are not part of the "standard" list of applications allowed to be installed according to policies, or these unapproved applications may have been installed by malware without necessarily notifying a user.

In order to address these issues, file-based application discovery may be used. File-based application discovery may be used in addition to or in place of process-based application discovery. Regardless of how it is used, file-based application discovery involves defining where and how for each software application of interest can be discovered. These definitions may include a directory path in which the software application is expected to be located, as well as a file name of the software application. The file name might or might not include a wildcard character or be in the form of a regular expression.

Figure 6:
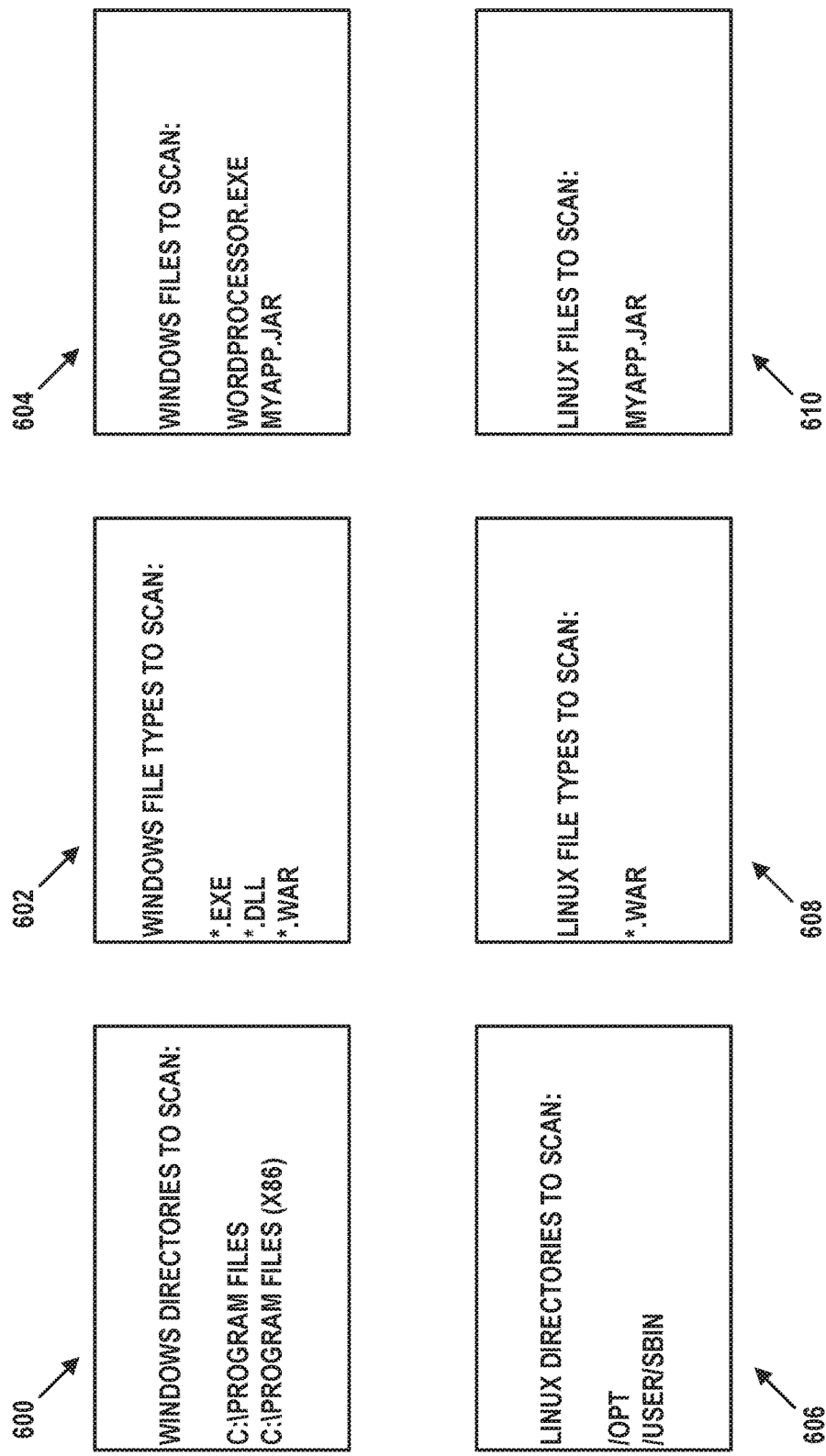
FIG. 6 depicts definitions of directories, file types, and file names, in accordance with example embodiments.

FIG. 6 provides example definitions for WINDOWS® and LINUX® systems. Items 600, 602, and 604 specify directories, file types, and file names to scan for WINDOWS® systems. For instance, item 600 specifies two directories ("c:\Program Files" and "c:\Program Files (x86)") that are commonly used to store executable files associated with software applications installed on a computing device. Each of these directories may contain further subdirectories that are also to be scanned even though they are not specified in item 600.

Item 602 specifies three types of files by their file name extensions ("*.exe" for executable files, "*.dll" for dynamically linked library files, and "*.war" for web application resource files). Each of these types of files is either executable, contains executable code, or may be accessed by an executing file. Item 604 specifies two particular files ("wordprocessor.exe" and "myapp.jar"). These files are either executable or contain executable code.

Note that the "*" wildcard can be interpreted as "zero or more characters" and is used to indicate that any files with these three file name extensions are to be discovered. For example, a directory specification "c:\Program Files*" would match both directories in item 600, and a file name specification "word*.exe" would match "wordprocessor.exe" in item 604. In addition to a wildcard (such as the "*" character), a regular expression may appear in any of these specifications. Further, any number of directories, file types, and file names may be respectively specified in items 600, 602, and 604. These directories, file types, and file names may be part of a standardized package and/or may be user-specified.

Similarly, items 606, 608, and 610 specify directories, file types, and file names to scan for LINUX® systems. For instance, item 606 specifies two directories ("/opt" and "/usr/sbin") that are commonly used to store executable files associated with software applications installed on a computing device. Each of these directories may contain further subdirectories that are also to be scanned even though they are not specified in item 606. Item 608 specifies a file type by its file name extension ("*.war"). Item 610 specifies a particular file ("myapp.jar"). As was the case for items 600, 602, and 604, a wildcard or a regular expression may appear in any of these specifications. Also, any number of directories, file types, and file names may be respectively specified in items 606, 608, and 610.

Once these items or similar items are configured on a computational instance, (such as computational instance 322), they can be provided to proxy servers 312 during discovery (e.g., during exploration phase 528 or a different or new phase). Then, such a proxy server can remotely access a computing device, and iterate through the directories specified in items 600 or 606 (depending on which type of operating system is on the computing device). For each directory, a listing of files matching each of the file types in item 602 or 608 may be taken, and information related to one or more of the files in the listing may be obtained. Furthermore, information related to each of the files specified by the file names may also be obtained. The per-file information may include, but is not limited to: file name, version, checksum, size, location (e.g., directory path), ownership, time created, or time last updated.

As an example, file-based application discovery for a computing device configured with the WINDOWS® operating system may proceed as follows. A proxy server invokes a remote shell session to the computing device. This session may take the form of a POWERSHELL® session that provides a command line interface to the computing system. By way of the command line, the proxy server may change directories to "c:\Program Files" as specified in item 600. Then, the proxy server may invoke a series of directory ("dir") commands, one for each of the file types of item 602 (e.g., "dir *.exe", "dir *.dll", and "dir *.war"). Alternatively, the POWERSHELL® Get-ChildItem command may be used.

The output of these commands may include a list of files matching the specified file types, as well as basic information about each file. This basic information may include, for example, a time creation or a time of last update, and a size in bytes. The proxy server may also invoke commands to obtain the properties of each file. These properties may include one or more of: a version, time of creation, time of last update, size, ownership, short description of the file, the operating system on which the file was discovered, and so on. The properties may exist as metadata stored within or associated with the file, and may be queried through various shell commands. The proxy server may further invoke a series of directory or other commands to determine whether any files with the specific files names in item 604 are present in the directory, and if so obtain their properties.

For each file discovered in this fashion, a checksum may be calculated based on one or more of content of the file, the file name, its location, size, and so on. For instance, the checksum may be a cryptographic hash (e.g., AES-256) calculated over one or more of these items.

TABLE 1

| Property | Value |
| --- | --- |
| File Name | wordprocessor.exe |
| Version | 1.7 |
| Checksum | A9259F9ED92103 |
| Size (bytes) | 4,370,521 |
| Location | c:\Program Files |
| Ownership | N/A |
| Created time | 2018-07-10:15:55:28 |
| Modified time | 2018-07-10:15:55:28 |
| Operating system | WINDOWS ® |

This process may recurse through any subdirectories within each directory of item 600. In each subdirectory, the proxy server may obtain the properties of files that match the file types of item 602 and files with file names specified in items 604. The process may be controlled by way of a script disposed upon the proxy server. Thus, the proxy server may collect the properties of files discovered in this fashion and provide these to CMDB 500. CMDB 500, in turn, may store a configuration item for each file and may also store the each file's associated properties as attributes of the file's configuration item.

Table 1 depicts an example of these attributes. In some cases, not all attributes can be determined by the proxy server. For instance, in Table 1, the ownership of the file has not been determined.

VI. Example Normalization of Discovered Applications

Once a file is discovered in the fashion described above, it can be normalized based on the content of a pre-existing canonical database of files and associated properties. Such a normalization database may be provided by a third-party vendor, for example, and may contain mappings of one or more file properties to other information that more specifically identifies the software application. For instance, a publisher, product, edition, version, and/or a product description of the software application may be determined with a high level of confidence from certain properties of the file.

Figure 7:
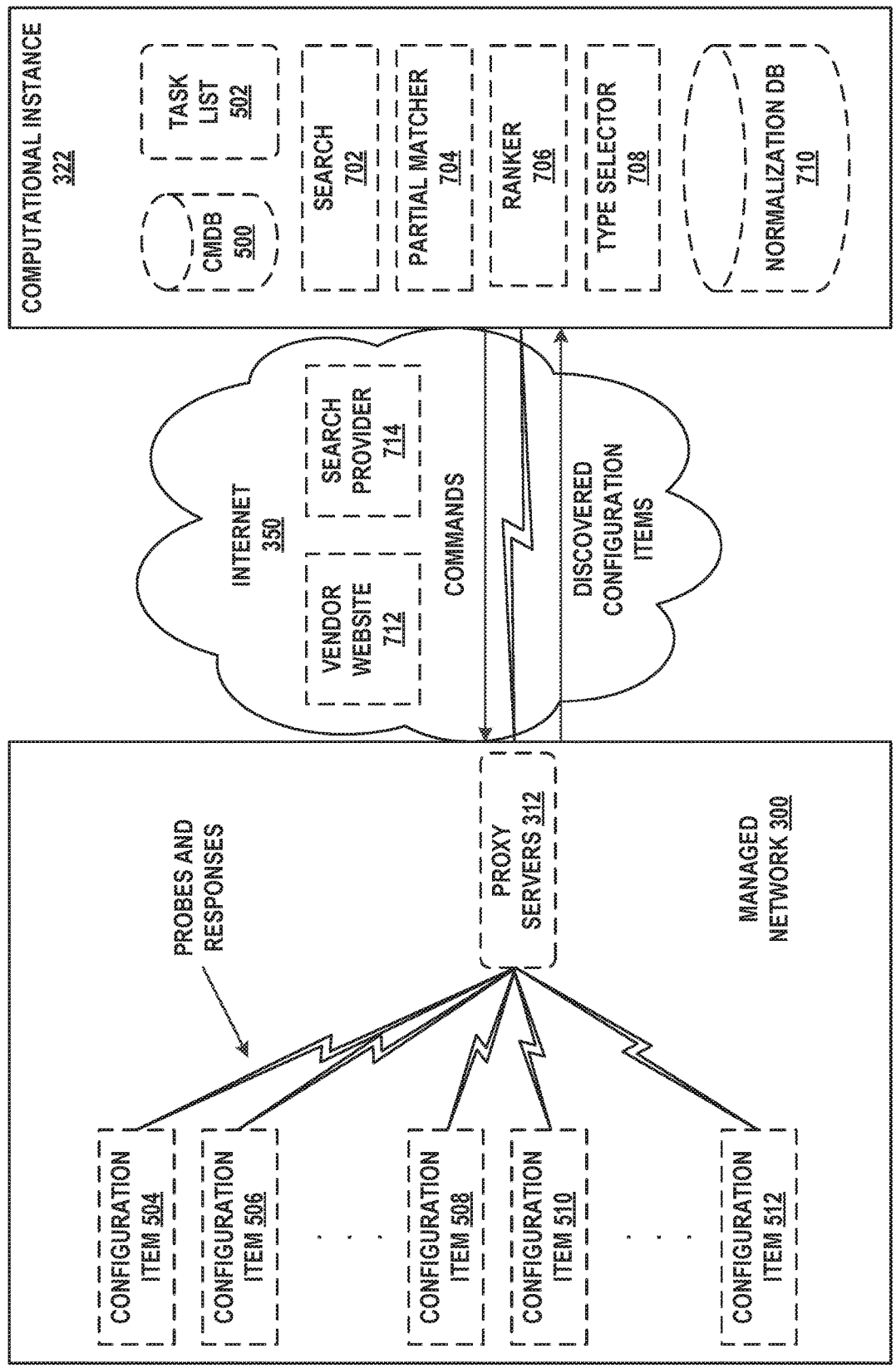
FIG. 7 depicts a communication environment for normalizing software discovered on a managed network, in accordance with example embodiments.

FIG. 7 provides a logical depiction of how files (referred to generally in this section as configuration items) can be normalized, as well as how normalized information related to discovered configuration items can be stored. For sake of simplicity, remote network management platform 320 and third-party networks 340 are not depicted. Though FIG. 7 includes additional details not included in FIG. 5A, it should be understood that the discovery process described above may be performed in conjunction with the additional features described with regard to FIG. 7.

In FIG. 7, CMDB 500, task list 502, search module 702, partial matcher module 704, ranker module 706, type selector module 708, and normalization database 710 are stored within computational instance 322. Normalization database 710 may be part of CMDB 500 or may be separate from CMDB 500.

Computational instance 322 may include one or more server devices that transmit, via Internet 350, discovery commands to a proxy server application associated with proxy servers 312. As noted above, proxy servers 312 may transmit probes to various computing devices disposed within managed network 300. These devices may transmit responses to proxy servers 312, and proxy servers 312 may then provide information regarding discovered files to CMDB 500 for storage therein as configuration items.

Search module 702, partial matcher module 704, ranker module 706, type selector module 708, and normalization database 710 may process the information provided by proxy servers 312. Once the information provided by proxy servers 312 has been normalized, the configuration items stored in CMDB 500 may be updated. Consequently, the updated configuration items stored in CMDB 500 may more accurately represent the files discovered in managed network 300.

Computational instance 322 may compare information received from proxy servers 312 to data stored in normalization database 710 to determine whether configuration items are correctly identified. For example, a software application may be represented normalization database 710 by parameters that include a publisher, product, edition, version, and a product description of the software application. Normalization database 710 may store or have access to data representative of parameters associated with known software applications that may be installed within managed network 300.

Though normalization database 710 is depicted as being disposed within computational instance 322, normalization database 710 might not be disposed with a particular computational instance at all, and may store data representative of several managed networks, or even a comprehensive set of every known device, service, or relationship of any managed network associated with remote network management platform 320. In such embodiments, one or more server devices disposed within computational instance 322 may communicate with normalization database 710 to normalize the configuration items. For instance, normalization database 710 may be disposed within a central instance of a remote network management platform, and may therefore be accessible by computational instances of the platform.

When comparing the information received from proxy servers 312 to the data stored in normalization database 710, computational instance 322 may determine that the identification parameters received from the proxy servers 312 are incomplete, or that they do not match identification parameters stored on the normalization database 710. In this case, computational instance 322 may invoke search 702, partial matcher 704, ranker 706, and/or type selector 708 modules to determine appropriate identification parameters to associate with the discovered file. Further, responsive to determining the appropriate identification parameters, computational instance 322 may update one or more configuration items associated with this file that are stored in CMDB 500.

Search module 702 may be configured to search external information sources, such as vendor website 712 owned by a software publisher (e.g. MICROSOFT®), or search provider 714 (e.g., GOOGLE® search or BING® search). Such searches may include as key words portions of the information received from proxy servers 312. For example, received information representative of a particular file may include an incomplete or unrecognized identification parameter, such as a file name. In response, search module 702 may search external information sources to determine a software application with which the file name is likely associated. Though only vendor website 712 and search provider 714 are displayed in FIG. 7, other information sources, such as a vendor application programming interface (API), may be used to determine incomplete information.

Search results from search module 702 may be passed to ranker module 706, which may apply a score to each search result and rank the results based on the applied score. The ranked search results may be passed to the type selector module 708, which selects a type of file from normalization database 710. To do so, type selector module 708 may invoke partial matcher module 704. Partial matcher module 704 may determine the known identification parameters stored within normalization database 710 that match a highly ranked search result from ranker module 706. Once a known identification parameter has been selected by the type selector module 708, the configuration item associated with the initially incomplete or unrecognized identification parameter may be updated within CMDB 500.

In other examples, search 702, partial matcher 704, ranker 706, and type selector 708 modules may be unable to determine a known identification parameter stored in normalization database 710 that appropriately corresponds to the configuration item associated with the initially incomplete or unrecognized identification parameter. In such examples, a GUI may prompt a user for manual entry of normalized identification parameters associated with the configuration item. In these examples, normalization database 710 may store the newly added normalization data (e.g., that was input into data entry fields of the GUI), for use when normalizing other configuration items.

In an example scenario, computational instance 322 may receive information from proxy servers 312 that is representative of a discovered file and store the information in CMDB 500. Configuration item 506 may be associated with a software program installed on a computing device within managed network 300. The information may include several parameters, including some or all of the information in Table 1. The pattern of these parameters that are used for identifying a software application may be referred to as a signature.

In the example scenario, computational instance 322 may attempt to normalize configuration item 506. First, computational instance 322 may access a representation of configuration item 506 by way of CMDB 500. However, in other examples, accessing the configuration item may be performed contemporaneously with receiving the information from proxy servers 312.

Then, computational instance 322 may identify full or partial matches between the signature of the accessed configuration item and data stored in normalization database 710. In the example scenario, computational instance 322 may compare known identification parameters stored in the normalization database 710 to the information representative of the signature. These sets of data may take the form of a plurality of strings in tables or other types of associations. For example, computational instance 322 may compare a signature defined by one or more of the file name, checksum, file size, or operating system to known identification parameters stored in normalization database 710.

TABLE 2

| Property | Value | | Software Product | |
|---|---|---|---|---|
| File Name | wordprocessor.exe | → | Publisher | Cyberdyne Systems |
| Checksum | A9259F9ED92103 | | Product | QuickWord |
| Size (bytes) | 4,370,521 | | Edition | 1 |
| Operating system | WINDOWS ® | | Version | 1.7 |

Table 2 represents a mapping that may be present in normalization database 710. In this example scenario, computational instance 322 may provide configuration item attribute values for the signature (file name, checksum, file size, and operating system) to normalization database 710 and receive as a result that the software application in question is edition 1, version 1.7 of a product "QuickWord" from publisher "Cyberdyne Systems". In this case, normalization database 710 was able to identify the software application directly.

In other situations, normalization database 710 may rely upon input from the search 702, partial matcher 704, ranker 706, and/or type selector 708 modules. For instance, if the file name was "wordproc.exe" but all other configuration item attributes were the same, then search 702, partial matcher 704, ranker 706, and/or type selector 708 modules may properly identify the software application based on the checksum, size, and/or other information.

Figure 8:
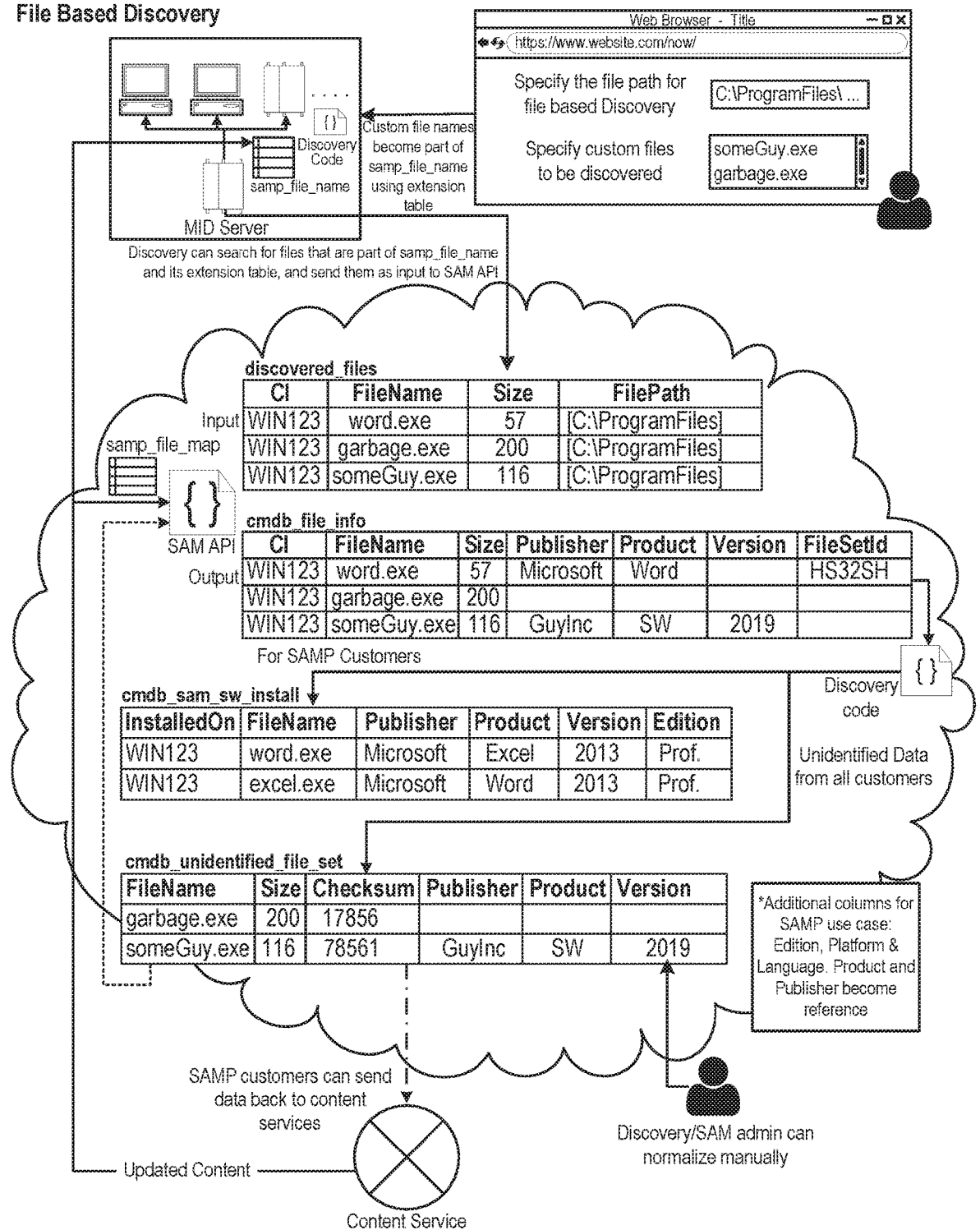
FIG. 8 depicts relationships between information related to discovered software and supporting database tables, in accordance with example embodiments.

This overall process is represented in FIG. 8. In this figure, relationships between data sources that supply data to various database tables are shown. The database tables are designated with the prefix "cmdb_".

Generally, normalization may be useful to an enterprise for various reasons. For example, each computing device of an enterprise may be tasked with performing a set of operations, and accordingly may use a combination of software applications to perform those operations. While some such software applications may be hosted by an aPaaS system, as described above in relation to FIGS. 1 through 5B, others may be installed on the individual computing, client, and/or server devices themselves. Such software is often proprietary, and may be licensed in various ways.

Regardless of the licensing scheme, the enterprise may attempt to keep track of which of its computing, client, and/or server devices use what licensed software. In so doing, the enterprise may determine whether it is in compliance with its various software licenses, whether it is using its licensed software efficiently, and whether it should purchase new software licenses.

Tracking software application usage across an entire enterprise may present challenges. A large enterprise may use thousands of separate computing devices, each of which may use a set of software applications. Further, such computing devices may go in and out of service, or require different software applications over time. Still further, different versions or builds of each software application may be installed across these computing devices.

Tracking the use of software within an enterprise may be achieved using an aPaaS system as described above in relation to FIGS. 1 through 5B, and more particularly in relation to FIGS. 6 and 7. Such an aPaaS system may be particularly suited to tracking such software usage because the aPaaS system may gather information from computing devices in managed networks such as the enterprise. Other techniques for tracking the use of software within an enterprise are possible as well.

In any case, when gathered information is normalized in line with the discussion above, this normalization process may help the enterprise to maintain more accurate identifying information about its software applications. And given such accurate identifying information about its software applications, the enterprise can then properly track usage of software applications and to what degree such usage complies with licenses associated with the software applications. Other examples are also possible.

For at least these reasons, the embodiments described herein provide a technical improvement over previous approaches for software asset management.

VII. Sharing Signature Updates

In some embodiments, a user of computational instance 322 (e.g., an administrator of this computational instance) may manually enter signatures that identify software applications and associated mappings products, publishers, versions, etc. Doing so allows computational instance 322 to stay up to date as new versions of software applications are deployed in its managed network.

Figure 9:
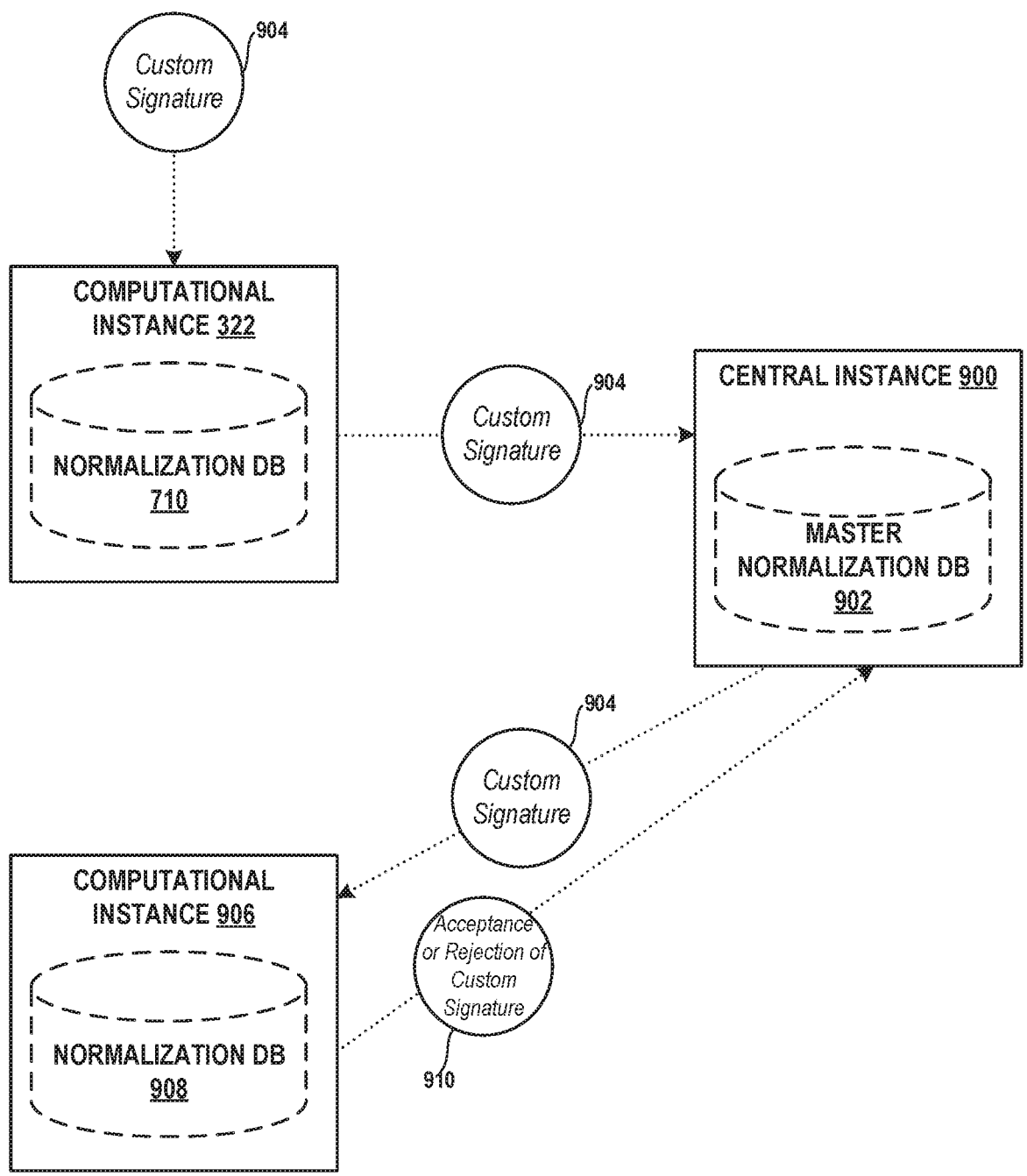
FIG. 9 depicts sharing information regarding discovered software between computational instances, in accordance with example embodiments.

FIG. 9 depicts a remote network management platform containing computational instance 322, central instance 900, and computational instance 906. As noted previously, computational instance 322 contains normalization database 710. Central instance 900 contains master normalization database 902, and computational instance 906 contains normalization database 908. The content of normalization database 710, master normalization database 902, and normalization database 908 may be identical or different. Central instance 900 may be operated by the same entity that operates the remote network management platform as a whole, while computational instance 322 and computational instance 906 may be used by different enterprises to manage respective managed networks. Regardless, this arrangement facilitates the sharing of signature updates from one or more computational instances to other computational instances.

For example, computational instance 322 may receive custom signature 904. This custom signature may be received, for example, by way of user input entered into a GUI or from a file. Custom signature 904 may include a signature of a file and a mapping of that file to parameters that identify a particular software application.

TABLE 3

| Property | Value | | Software | Product |
|---|---|---|---|---|
| File Name | wordproc.exe | → | Publisher | Cyberdyne Systems |
| Checksum | A9259F9ED92103 | | Product | QuickWord |
| Size (bytes) | 4,370,521 | | Edition | 1 |
| Operating system | WINDOWS ® | | Version | 1.7 |

To that point, suppose that for some QuickWord installations, the file name has been changed from "wordprocessor.exe" to "wordproc.exe", but all other properties are identical. Thus, computational instance 322 might not always be able to identify "wordproc.exe" as belong to QuickWord. An administrator of computational instance 322 may then create the custom signature and mapping shown in Table 3. Using this custom signature and mapping, the software application associated with the file name "wordproc.exe" can be properly identified.

Computational instance 322 may be configured to transmit custom signature 904 to central instance 900. Such a transmission might happen automatically on a scheduled basis, or upon demand. Further, the transmission might not take place unless it is specifically permitted by computational instance 322. In some cases, the transmission may be anonymized so that information that identifies computational instance 322 or its managed network is removed.

After receiving custom signature 904, central instance 900 may incorporate it into master normalization database 902, or may store it for further review and vetting. As an example, an administrator of central instance 900 may manually review custom signature 904 for accuracy before allowing it to be included in master normalization database 902.

In some situations, the administrator of central instance 900 may collect some number of custom signatures before incorporating any into master normalization database 902. In this way, a form of crowd sourcing can be used to identify custom signatures that are common amongst multiple computational instances. For example, if more than a threshold number (e.g., 3, 5, 10, 20) computational instances all provide the same custom signature, then the administrator of central instance 900 may have a greater degree of confidence that this custom signature is accurate and appropriate for inclusion in master normalization database 902.

Moreover, and as shown in FIG. 9, custom signature 904 (possibly as well as some other custom signatures) may be provided to other computational instances. In FIG. 9, central instance 900 provides custom signature 904 to computational instance 906. An administrator of computational instance 906 may determine whether to accept or reject custom signature 904. If custom signature 904 is accepted, it may be included in normalization database 908. If it is rejected, it might not be included in normalization database 908. Regardless of the outcome, an indication 910 of the acceptance or rejection of custom signature 904 may be provided to central instance 900. In this way, the normalization databases of other computational instances can be kept up to date in an automated or semi-automated fashion.

VIII. Example Operations

Figure 10:
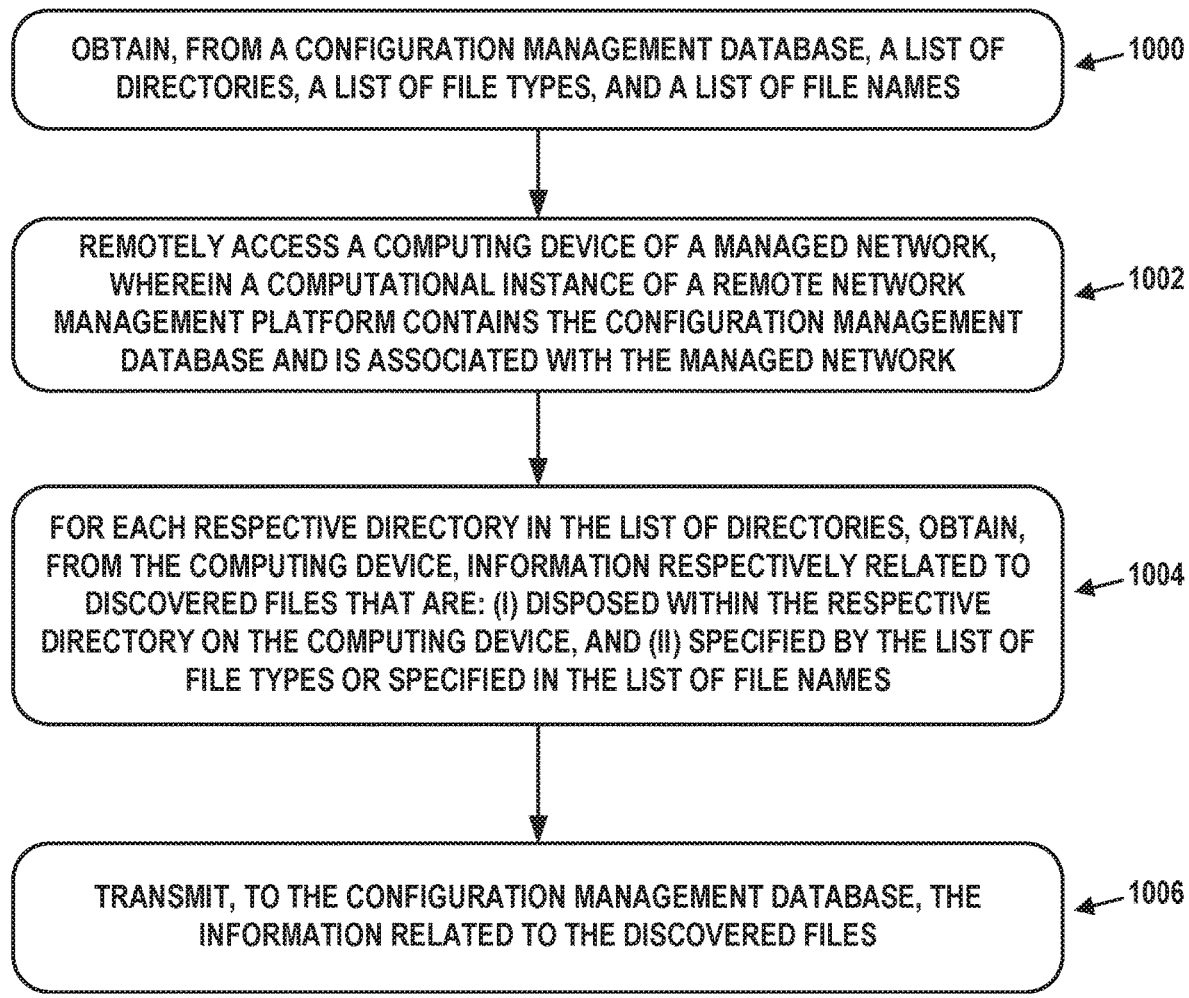
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve obtaining, by a software application executing on a server device and from a configuration management database, a list of directories, a list of file types, and a list of file names.

Block 1002 may involve remotely accessing, by the software application, a computing device of a managed network. A computational instance of a remote network management platform may contain the configuration management database and may be associated with the managed network. In some embodiments, the server device is disposed within the managed network.

Block 1004 may involve, for each respective directory in the list of directories, obtaining, from the computing device, information respectively related to discovered files that are: (i) disposed within the respective directory on the computing device, and (ii) specified by the list of file types or specified in the list of file names.

Block 1006 may involve transmitting, to the configuration management database, the information related to the discovered files.

In some embodiments, the computational instance further contains a normalization database that associates information related to files with definitions of software products, and the computational instance is configured to perform further operations comprising: based on the information related to the discovered files stored in the configuration management database, identifying a particular discovered file within the discovered files; querying the normalization database with information related to the particular discovered file; receiving, from the normalization database, a definition of a software product associated with the information related to the particular discovered file; and updating the configuration management database to indicate that the particular discovered file is an instance of the software product.

In some embodiments, the definition of the software product includes one or more of a publisher name of the software product, a product name of the software product, an edition of the software product, or a version of the software product.

In some embodiments, the remote network management platform includes a central instance operated by an entity that also operates the remote network management platform, and the computational instance is further configured to: obtain, by way of a client device, input defining a mapping between the information related to a particular discovered file and a definition of a particular software product; and transmit, to the central instance, a representation of the mapping.

In some embodiments, the central instance contains a master normalization database and is configured to: receive, from the computational instance, the representation of the mapping; and possibly based on at least one condition being met, store, in the master normalization database, the representation of the mapping.

In some embodiments, the at least one condition comprises the central instance receiving representations of the mapping from at least a threshold number of computational instances, where each of the computational instances is associated with a different managed network.

In some embodiments, a second computational instance is disposed within the remote network management platform and associated with a second managed network, and the central instance is configured to transmit, to the second computational instance, the representation of the mapping.

In some embodiments, at least one of the list of directories, the list of file types, or the list of file names contains a wildcard character or is in a form of a regular expression.

In some embodiments, remotely accessing the computing device of the managed network comprises logging in to the computing device by way of a command shell.

In some embodiments, the information respectively related to the discovered files comprises, for a particular discovered file of the discovered files, one or more of: a file name of the particular discovered file, a version associated with the particular discovered file, a checksum related to the particular discovered file, a size of the particular discovered file, a location of the particular discovered file within a file system of the computing device, an ownership of the particular discovered file, a time that the particular discovered file was created, or a time that the particular discovered file was last updated.

IX. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
a computational instance disposed within a remote network management platform and associated with a managed network, wherein the computational instance contains a configuration management database, wherein the computational instance is configured to perform first operations comprising:
receiving an input indicative of a mapping between a signature and a definition of a software product;
transmitting, to a normalization database, the mapping and the signature; and
a software application disposed on a server device of the managed network and configured to perform second operations comprising:
obtaining, from the configuration management database, a list of directories, a list of file types, and a list of file names;
remotely accessing a computing device of the managed network;
based on the list of directories, the list of file types, and the list of file names,
determining a listing of files on the computing device;
for each respective directory in the list of directories, obtaining, from the computing device, information respectively related to at least one file of the listing of files, wherein the at least one file of the listing of files is: (i) disposed within the respective directory on the computing device, and (ii) specified by the list of file types or specified in the list of file names;
determining identification parameters associated with the at least one file based on the information related to the at least one file;
querying the normalization database with the identification parameters;
receiving, from the normalization database, the definition of the software product based on the mapping and a comparison between the identification parameters and the signature;
based on the definition of the software product and the information related to the at least one file of the listing of files, receiving a condition related to the at least one file;
based on the condition, flagging the at least one file within the listing of files, wherein the at least one file corresponds to the software product configured to execute on the computing device; and
transmitting, to the configuration management database, the information related to the at least one file.

2. The computing system of claim 1, wherein the computational instance contains the normalization database, and wherein the first operations comprise:
receiving a second input indicative of a second mapping between a second signature and a second software product;
querying, based on the identification parameters, an external source associated with a respective software publisher;
receiving, from the external source, a set of second identification parameters associated with the second software product; and
based on the identification parameters at least partially matching the set of second identification parameters, updating the configuration management database to indicate that the at least one file is an instance of the second software product.

3. The computing system of claim 2, wherein the definition of the software product includes one or more of a publisher name of the software product, a product name of the software product, an edition of the software product, or a version of the software product.

4. The computing system of claim 1, wherein the remote network management platform includes a central instance operated by an entity that also operates the remote network management platform, and wherein the computational instance is configured to:
transmit, to the central instance, a representation of the mapping.

5. The computing system of claim 4, wherein the central instance contains a master normalization database and is configured to:
receive, from the computational instance, the representation of the mapping; and
based on the condition being met, store, in the master normalization database, the representation of the mapping.

6. The computing system of claim 5, wherein the condition comprises the central instance receiving representations of the mapping from at least a threshold number of computational instances, wherein each computational instance of the computational instances is associated with a different managed network.

7. The computing system of claim 5, wherein a second computational instance is disposed within the remote network management platform and associated with a second managed network, and wherein the central instance is configured to:
transmit, to the second computational instance, the representation of the mapping.

8. The computing system of claim 1, wherein the information respectively related to the at least one file of the listing of files comprises:
one or more of: a file name of the at least one file, a version associated with the at least one file, a checksum related to the at least one file, a size of the at least one file, a location of the at least one file within a file system of the computing device, an ownership of the at least one file, a time that the at least one file was created, or a time that the at least one file was last updated.

9. The computing system of claim 1, wherein the condition comprises a threshold number of instances of the at least one file.

10. The computing system of claim 9, wherein the second operations comprise:
remotely accessing a plurality of computing devices of the managed network;
based on the list of directories, the list of file types, and the list of file names, determining a corresponding listing of files on each computing device of the plurality of computing devices;
based on the corresponding listing of files on each computing device, determining a number of instances of the at least one file; and
comparing the number of instances of the at least one file to the threshold number of instances.

11. The computing system of claim 10, wherein the second operations comprise:
based on the comparison, flagging at least one instance of the at least one file for removal from a corresponding computing device of the plurality of computing devices, wherein the threshold number of instances corresponds to a number of software licenses associated with the software product.

12. A computer-implemented method comprising:

obtaining, by a software application disposed on a server device of a managed network and from a configuration management database, a list of directories, a list of file types, and a list of file names;

remotely accessing, by the software application, a computing device of the managed network;

based on the list of directories, the list of file types, and the list of file names, determining a listing of files on the computing device;

for each respective directory in the list of directories, obtaining, by the software application and from the computing device, information respectively related to at least one file of the listing of files, wherein the at least one file of the listing of files is: (i) disposed within the respective directory on the computing device, and (ii) specified by the list of file types or specified in the list of file names;

determining identification parameters associated with the at least one file based on the information related to the at least one file;

querying a normalization database with the identification parameters, wherein the normalization database comprises a signature associated with a software product and a mapping between the signature and a definition of the software product;

receiving, from the normalization database, the definition of the software product based on the mapping and based on a comparison between the identification parameters and the signature;

based on the definition of the software product and the information related to the at least one file of the listing of files, receiving a condition related to the at least one file;

based on the condition, flagging the at least one file within the listing of files, wherein the at least one file corresponds to the software product configured to execute on the computing device; and transmitting, by the software application and to the configuration management database, the information related to the at least one file.

13. The computer-implemented method of claim 12, wherein a computational instance is disposed within a remote network management platform and associated with the managed network, wherein the computational instance contains the configuration management database.

14. The computer-implemented method of claim 13, wherein the computational instance contains the normalization database that associates information related to the listing of files with definitions of software products, and wherein the computational instance is configured to perform operations comprising:

receiving a second input indicative of a second mapping between a second signature and a second software product;

querying, based on the identification parameters, an external source associated with a respective software publisher;

receiving, from the external source, a set of second identification parameters associated with the second software product; and based on the identification parameters at least partially matching the set of second identification parameters, updating the configuration management database to indicate that the at least one file is an instance of the second software product.

15. The computer-implemented method of claim 13, wherein the remote network management platform includes a central instance operated by an entity that also operates the remote network management platform, and wherein the computational instance is configured to:

obtain, by way of a client device, input defining the mapping between the signature and the definition of the software product; and transmit, to the central instance, a representation of the mapping.

16. The computer-implemented method of claim 15, wherein the central instance contains a master normalization database and is configured to:

receive, from the computational instance, the representation of the mapping; and based on the condition being met, store, in the master normalization database, the representation of the mapping.

17. The computer-implemented method of claim 16, wherein the condition comprises the central instance receiving representations of the mapping from at least a threshold number of computational instances, wherein each computational instance of the computational instances is associated with a different managed network.

18. The computer-implemented method of claim 16, wherein a second computational instance is disposed within the remote network management platform and associated with a second managed network, and wherein the central instance is configured to:

transmit, to the second computational instance, the representation of the mapping.

19. An article of manufacture including a non-transitory computer-readable medium, having stored thereon program instructions that, upon execution by a computing system, cause the computing system to perform operations comprising:

obtaining, from a configuration management database, a list of directories, a list of file types, and a list of file names;

remotely accessing a computing device of a managed network;

based on the list of directories, the list of file types, and the list of file names, determining a listing of files on the computing device;

for each respective directory in the list of directories, obtaining, from the computing device, information respectively related to at least one file of the listing of files, wherein the at least one file of the listing of files is: (i) disposed within the respective directory on the computing device, and (ii) specified by the list of file types or specified in the list of file names;

determining identification parameters associated with the at least one file based on the information related to the at least one file;

querying a normalization database with the identification parameters, wherein the normalization database comprises a signature associated with a software product and a mapping between the signature and a definition of the software product;

receiving, from the normalization database, the definition of the software product based on the mapping and based on a comparison between the identification parameters and the signature;

based on the definition of the software product and the information related to the at least one file of the listing of files, receiving a condition related to the at least one file;

based on the condition, flagging the at least one file within the listing of files, wherein the at least one file corresponds to the software product configured to execute on the computing device; and transmitting, to the configuration management database, the information related to the at least one file.

20. The article of manufacture of claim 19, wherein a computational instance is disposed within a remote network management platform and associated with the managed network, wherein the computational instance contains the configuration management database, wherein the computational instance contains the normalization database that associates information related to the listing of files with definitions of software products, and wherein the computational instance is configured to perform operations comprising:

receiving a second input indicative of a second mapping between a second signature and a second software product;

querying, based on the identification parameters, an external source associated with a respective software publisher;

receiving, from the external source, a set of second identification parameters associated with the second software product; and based on the identification parameters at least partially matching the set of second identification parameters, updating the configuration management database to indicate that the at least one file is an instance of the second software product.

* * * * *